US009547774B2

(12) United States Patent
Bestler et al.

(10) Patent No.: US 9,547,774 B2
(45) Date of Patent: Jan. 17, 2017

(54) SYSTEM AND METHOD FOR DISTRIBUTED DEDUPLICATION OF ENCRYPTED CHUNKS

(71) Applicant: Nexenta Systems, Inc., Santa Clara, CA (US)

(72) Inventors: Caitlin Bestler, Sunnyvale, CA (US); Alexander Aizman, Mountain View, CA (US)

(73) Assignee: Nexenta Systems, Inc., Santa Clara, CA (US)

( * ) Notice: Subject to any disclaimer, the term of this patent is extended or adjusted under 35 U.S.C. 154(b) by 0 days.

(21) Appl. No.: 14/688,936

(22) Filed: Apr. 16, 2015

(65) Prior Publication Data

US 2015/0227757 A1 Aug. 13, 2015

Related U.S. Application Data

(63) Continuation-in-part of application No. 13/552,584, filed on Jul. 18, 2012, now Pat. No. 9,037,856.

(51) Int. Cl.
| H04L 9/00 | (2006.01) |
| G06F 21/62 | (2013.01) |
| H04L 9/32 | (2006.01) |
| H04L 29/06 | (2006.01) |
| H04L 9/08 | (2006.01) |

(52) U.S. Cl.
CPC ......... *G06F 21/6227* (2013.01); *H04L 9/0863* (2013.01); *H04L 9/3239* (2013.01); *H04L 63/0428* (2013.01); *H04L 2209/76* (2013.01)

(58) Field of Classification Search
None
See application file for complete search history.

(56) References Cited

U.S. PATENT DOCUMENTS

| 6,052,466 | A | 4/2000 | Wright |
| 8,074,049 | B2 | 12/2011 | Gelson et al. |
| 8,117,464 | B1 | 2/2012 | Kogelnik |
| 8,199,911 | B1 | 6/2012 | Tsaur et al. |
| 8,266,430 | B1 | 9/2012 | Lumb |
| 8,281,143 | B1 | 10/2012 | Clifford et al. |
| 9,037,856 | B2 | 5/2015 | Bestler et al. |
| 2002/0164022 | A1 | 11/2002 | Strasser et al. |
| 2003/0093579 | A1 | 5/2003 | Zimmer et al. |
| 2004/0153458 | A1 | 8/2004 | Noble et al. |
| 2004/0153620 | A1 | 8/2004 | Eisen et al. |
| 2005/0180574 | A1 | 8/2005 | Ritz et al. |
| 2007/0250673 | A1 | 10/2007 | Eidswick |

(Continued)

OTHER PUBLICATIONS

Mark W. Storer, et al. "Secure Data Deduplication", Oct. 31, 2008, 10 sheets, StorageSS'08, Fairfax, Virginia.

*Primary Examiner* — David Le
(74) *Attorney, Agent, or Firm* — Okamoto & Benedicto LLP

(57) ABSTRACT

The present disclosure relates to an advantageous system and related methods for distributed deduplication of encrypted chunks. One embodiment relates to a method for storing encrypted chunks in which an encryption key is generated independently from a chunk payload. With this method, two encrypted chunks are identifiable as having identical chunk payloads even when the chunk payloads are encrypted with different encryption keys. Other embodiments, aspects and features are also disclosed.

6 Claims, 9 Drawing Sheets

(56) References Cited

U.S. PATENT DOCUMENTS

| | | |
|---|---|---|
| 2008/0219451 A1 | 9/2008 | Ju et al. |
| 2009/0012982 A1 | 1/2009 | Merchia et al. |
| 2009/0013140 A1 | 1/2009 | Bonduran et al. |
| 2009/0268903 A1 | 10/2009 | Bojinov et al. |
| 2010/0034380 A1 | 2/2010 | Lee |
| 2010/0058013 A1 | 3/2010 | Gelson et al. |
| 2010/0169293 A1 | 7/2010 | Gerber et al. |
| 2010/0211987 A1 | 8/2010 | Chou |
| 2010/0313036 A1 | 12/2010 | Lumb |
| 2010/0313040 A1 | 12/2010 | Lumb |
| 2011/0040732 A1 | 2/2011 | Anglin |
| 2011/0145566 A1 | 6/2011 | Nice et al. |
| 2011/0258374 A1 | 10/2011 | Pertocelli et al. |
| 2012/0030176 A1 | 2/2012 | Gelson et al. |
| 2012/0045054 A1 | 2/2012 | Main et al. |
| 2012/0078844 A1 | 3/2012 | Kim |
| 2012/0110108 A1* | 5/2012 | Li .................. H04L 67/2852 709/213 |
| 2012/0158672 A1 | 6/2012 | Oltean et al. |
| 2012/0159175 A1 | 6/2012 | Yocom-Piatt et al. |
| 2012/0204024 A1 | 8/2012 | Augenstein et al. |
| 2013/0101113 A1 | 4/2013 | Cannon et al. |
| 2013/0138620 A1 | 5/2013 | Yakushev et al. |
| 2013/0275744 A1 | 10/2013 | Resch |

\* cited by examiner

"Convergent Encryption" (Prior System)     100

200

SYSTEM AND METHOD FOR DISTRIBUTED DEDUPLICATION OF ENCRYPTED CHUNKS

CROSS-REFERENCE TO RELATED APPLICATION(S)

The present patent application is a continuation-in-part of U.S. patent application Ser. No. 13/552,584, filed Jul. 18, 2012, the disclosure of which is hereby incorporated by reference.

BACKGROUND

Technical Field

The present disclosure relates generally to data storage systems. More particularly, the present disclosure relates to data storage systems supporting cloud storage system protocols and providing inline distributed deduplication services.

Description of the Background Art

With the increasing amount of data is being created, there is increasing demand for data storage solutions. Storing data using a cloud storage service is a solution that is growing in popularity. A cloud storage service may be publicly-available or private to a particular enterprise or organization. Popular public cloud storage services include Amazon S3™, the Google File System™, and the OpenStack Object Storage (Swift) System™.

Cloud storage systems may provide "get" and "put" access to objects, where an object includes a payload of data being stored. The payload of an object may be stored in parts referred to as "chunks". Using chunks enables the parallel transfer of the payload and allows the payload of a single large object to be spread over multiple storage servers.

With the increasing need for archival data storage, it is highly desirable for a cloud storage system to be efficient in storing large data sets. Deduplication is one technique for substantially improving the efficiency of a cloud storage system. Deduplication identifies identical data chunks in a storage system so as to avoid storing duplicative copies of the same chunk. Distributed Deduplication is a more advanced form of deduplication that also avoids transferring duplicative copies of the same chunk over the network.

For reasons of data security and privacy for users, it is also highly desirable provide end-to-end encryption of data chunks in a cloud storage system. End-to-end encryption requires chunks to be stored and transmitted only when they are encrypted.

However, it is challenging to only store and transmit encrypted chunks in a distributed system while, at the same time, retaining the ability to determine whether two chunks are identical for data deduplication. The present disclosure provides an advantageous solution to this challenge.

SUMMARY

The present disclosure relates to an advantageous system and related methods for distributed deduplication of encrypted chunks.

One embodiment relates to a method for storing encrypted chunks in which an encryption key is generated independently from a chunk payload. With this method, two encrypted chunks are identifiable as having identical chunk payloads even when the chunk payloads are encrypted with different encryption keys.

Another embodiment relates to a method for retrieving chunks of data from a distributed deduplication storage system. In this method, in response to a request for a chunk from a client, an encrypted chunk payload and an encrypted chunk key are retrieved. The encrypted chunk key is decrypted and then re-encrypted specifically for the client that sent the request. The encrypted chunk payload and the re-encrypted chunk key are then returned to that client.

Another embodiment relates to a storage system that includes a client which generates an encryption key independently from the chunk payload. In this system, two encrypted chunks are identifiable as having identical chunk payloads even when the chunk payloads are encrypted with different encryption keys.

Another embodiment relates to a storage system that includes a storage server that, in response to a request for a chunk from a client, retrieves an encrypted chunk payload and an encrypted chunk key. The storage server decrypts the encrypted chunk key and then re-encrypts the chunk key specifically for the client that sent the request. The encrypted chunk payload and the re-encrypted chunk key are then returned by the storage server to that client.

Other embodiments, aspects, and features are also disclosed.

DETAILED DESCRIPTION

Figure 1:
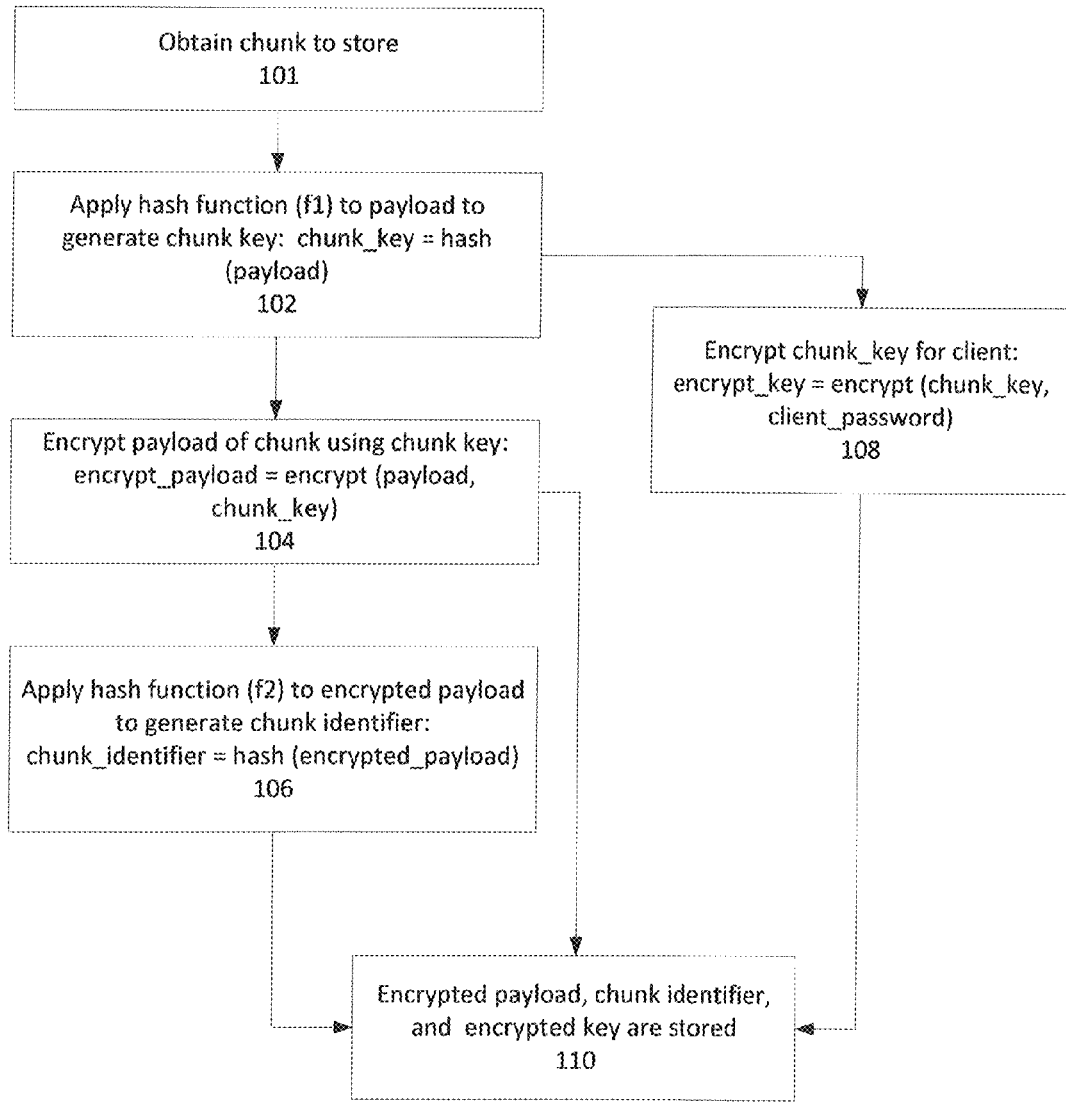
FIG. 1 is a flow chart of a conventional method which uses "convergent encryption" for encrypting chunks in a distributed deduplication system.

The present disclosure relates to the distributed deduplication of encrypted chunks. The method and system described herein allows for encryption of the stored chunk payload both in transit and as stored on disk. This is done to provide end-to-end storage encryption where the stored content is encrypted before it is transmitted to the storage server, is stored in that encrypted format, and is decrypted after it is retrieved. End-to-end storage encryption contrasts with in-flight encryption, which only encrypts the stored payload while it is in flight over the network, and at-rest encryption which only encrypts the stored payload when it is stored on non-volatile media at the storage server.

A storage system that employs distributed deduplication relies on distributed components, typically co-located with, or at least near, the storage clients, to use a cryptographic hash (or other fingerprinting) algorithm to generate an identifying fingerprint of each chunk to be stored. When a given fingerprint (chunk identifier) is already known by the chunk storage system, it does not need to accept a duplicate copy over the network. A given chunk only needs to be accepted by the object storage system once.

End-to-end encryption of stored chunks is desirable to provide unified protection for data both in transit and as when it is stored. However, end-to-end encryption is also distributed encryption. The goals of identifying common content and protecting it are in conflict. Prior efforts have either concluded that the goals were incompatible, or have tailored the encryption system such that any two clients encrypting the same chunk would use the same encryption key, while making that encryption key unpredictable to any not in possession of the chunk payload.

The weakness of such a solution is that deriving an encryption key from the payload creates a potentially exploitable pattern that may allow for a successful attack at less cost than a brute force linear attack. While there is no known algorithm to exploit the correlation between the chunk payload and the encryption key, a storage system that relied on this method would be unable to recover should such as an attack algorithm be developed. This is because the distributed deduplication algorithm in this case is dependent on the encryption key being consistent for all clients referencing the same payload.

As described in detail below, the present disclosure avoids this weakness and provides an advantageous system which uses a client-generated, effectively-random encryption key for each chunk, rather than relying on an algorithmically-derived key. Although the encryption keys are randomly generated, the system nevertheless enables the identification of each chunk based on a fingerprint (such as a cryptographic hash, for example) of the unencrypted chunk payload. When optional compression is allowed, the fingerprinting may be done either before or after compression as long as one method is selected consistently. In a preferred embodiment fingerprinting is done after compression. This will be slightly more efficient unless the fingerprint is calculated as a byproduct of the compression algorithm, a requirement that would make re-use of existing compression libraries difficult. The payload is only transferred or stored while encrypted with the client-generated, random chunk key, while the chunk key is only transferred when encrypted for the target machine or user.

While the chunk servers in the presently-disclosed system never store the unencrypted chunk payload, the techniques described herein allow them to verify that the client-supplied chunk identifier is correct. This provides a further advantage of preventing a rogue client from corrupting the distributed de-duplicated chunk storage system by submitting an incorrect payload for a fingerprint for content anticipated to be uploaded by other users.

Prior ("Convergent Encryption") System

A prior system is described in "Secure Data Deduplication," by Mark W. Stoner, Kevin Greenan, Darrell D. E. Long, and Ethan L. Miller, *StorageSS* '08 (2008). This prior system uses "convergent encryption" for distributed deduplication of encrypted chunks. Select aspects of this prior system are described below in relation to the method 100 depicted in FIG. 1.

As shown, after a chunk to be stored is obtained per step 101, a chunk key may be generated per step 102. The generation of the chunk key is performed by applying a first hash function (f1) to the payload of the chunk. This may be expressed in equation form as: chunk_key=hash (payload).

Subsequently, per step 104, the payload is encrypted using the chunk key. In equation form, encrypt_payload=encrypt (payload, chunk_key). The identifier for the chunk is then generated, per step 106, by applying a second hash function (f2) to the encrypted payload. In equation form, chunk_identifier=hash (encrypted_payload).

In addition, per step 108, the chunk key is encrypted for the client by using a client password such that the client may decrypt it. Expressed as an equation: encrypt_key=encrypt (chunk_key, client_password). Finally, per step 110, the encrypted payload, chunk identifier, and encrypted key are stored in the system.

While the above-discussed "convergent encryption" system does provide some level of data security, applicants have identified certain inherent weaknesses of such a system. First, because the chunk key is based on the payload (such that the same content is encrypted in the same way), the chunk key has a predictability that may be exploited. Second, once the chunk encryption is cracked, it is cracked for the entire system from that time forward. It would then be necessary, for example, to place all new chunks in a different system which utilizes alternate encryption.

Presently-Disclosed System

The presently-disclosed system is a new system which avoids the above-discussed weaknesses of the prior "convergent encryption" system. First, because the chunk key is effectively-random in its generation, the potentially exploitable predictability of the chunk key generation is avoided. Second, if the encryption of one chunk is cracked, the rest of the system remains secure because the chunks are encrypted with different, randomly-generated chunk keys. Significantly, deduplication is enabled despite the fact that identical chunks are potentially encrypted with different chunk keys.

Table 1 below compares and contrasts a few aspects of the prior "convergent encryption" system and the presently-disclosed system.

TABLE 1

Comparision between "Convergent Encryption" and Presently-Disclosed Technique

| | "Convergent Encryption" System | Presently-Disclosed System |
| --- | --- | --- |
| chunk key | hash of plaintext payload (so identical chunks have identical keys) | randomly generated at client (so identical chunks have different keys) |
| chunk identifier | hash of encrypted payload | hash of (optionally compressed) plaintext payload |
| deduplication capability | identical chunks have identical chunk identifiers for deduplication purposes | identical chunks have identical chunk identifiers for deduplication purposes |

In the following discussion, a chunk generally refers to a sequence of bytes found in one or more objects. If compressed (which is optional), the chunk may also have the attributes identifying the compression algorithm used, and the resulting compressed length, stored in metadata for the chunk. A chunk image refers to a persistent image of a chunk which may be maintained by a specific storage server (chunk server). The specific storage server may encode the chunk payload and metadata of the chunk. A chunk identifier refers to a unique identifier of a chunk. The chunk identifier may be generated by applying a cryptographic hash (or other fingerprinting) algorithm to take the "fingerprint" of the (optionally compressed) payload of the chunk.

Figure 2:
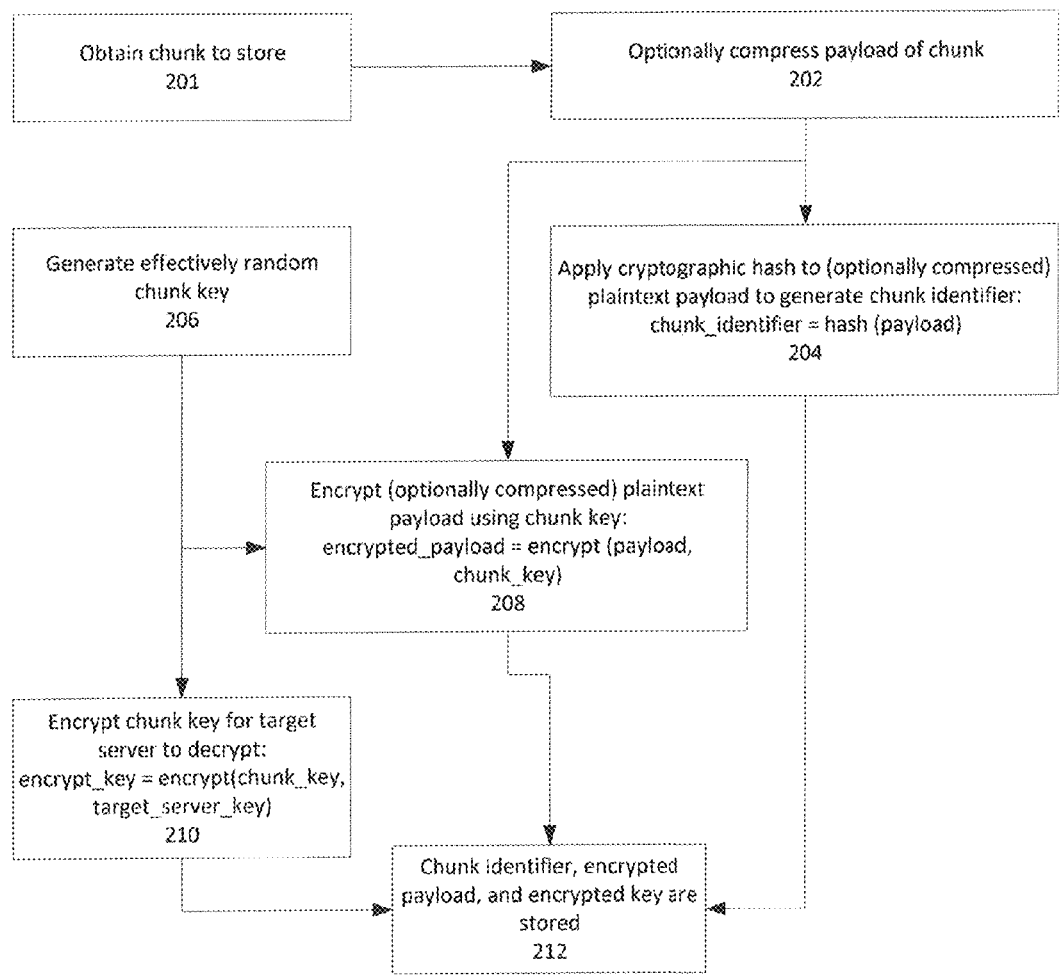
FIG. 2 is a flow chart of a method for encrypting chunks in a distributed deduplication system in accordance with an embodiment of the invention.

FIG. 2 is a flow chart of a method 200 for encrypting chunks in a distributed deduplication system in accordance with an embodiment of the invention. As shown, after a chunk to be stored is obtained per step 201, the plaintext (unencrypted) payload of the chunk may be compressed per step 202. This compression step is optional in that the scope of the invention is intended to cover both a compressed plaintext payload and an uncompressed plaintext payload.

Per step 204, a cryptographic hash (or other fingerprinting process) is applied the (optionally compressed) plaintext payload so as to generate the chunk identifier. This may expressed in equation form as: chunk_identifier=hash (payload).

In addition, a chunk key may be effectively randomly generated per step 206. If a true random number generator is not available, the chunk key should be "salted" with as many sources as are available to the process. There are many well-known techniques for generating effectively random numbers in lieu of access to a truly random input stream.

Subsequently, per step 208, the (optionally compressed) plaintext payload is encrypted using the chunk key. In equation form, encrypt_payload=encrypt (payload, chunk_key).

In addition, per step 210, the chunk key is encrypted for the target chunk server. Expressed as an equation: encrypt_key=encrypt (chunk_key, target_server_key).

Finally, per step 212, the chunk identifier, encrypted payload and encrypted key are stored. Note that, as shown above in Table 1, the chunk identifier and chunk key in the method 200 of FIG. 2 are very different from the chunk identifier and chunk key in the method 100 of FIG. 1.

Figure 3:
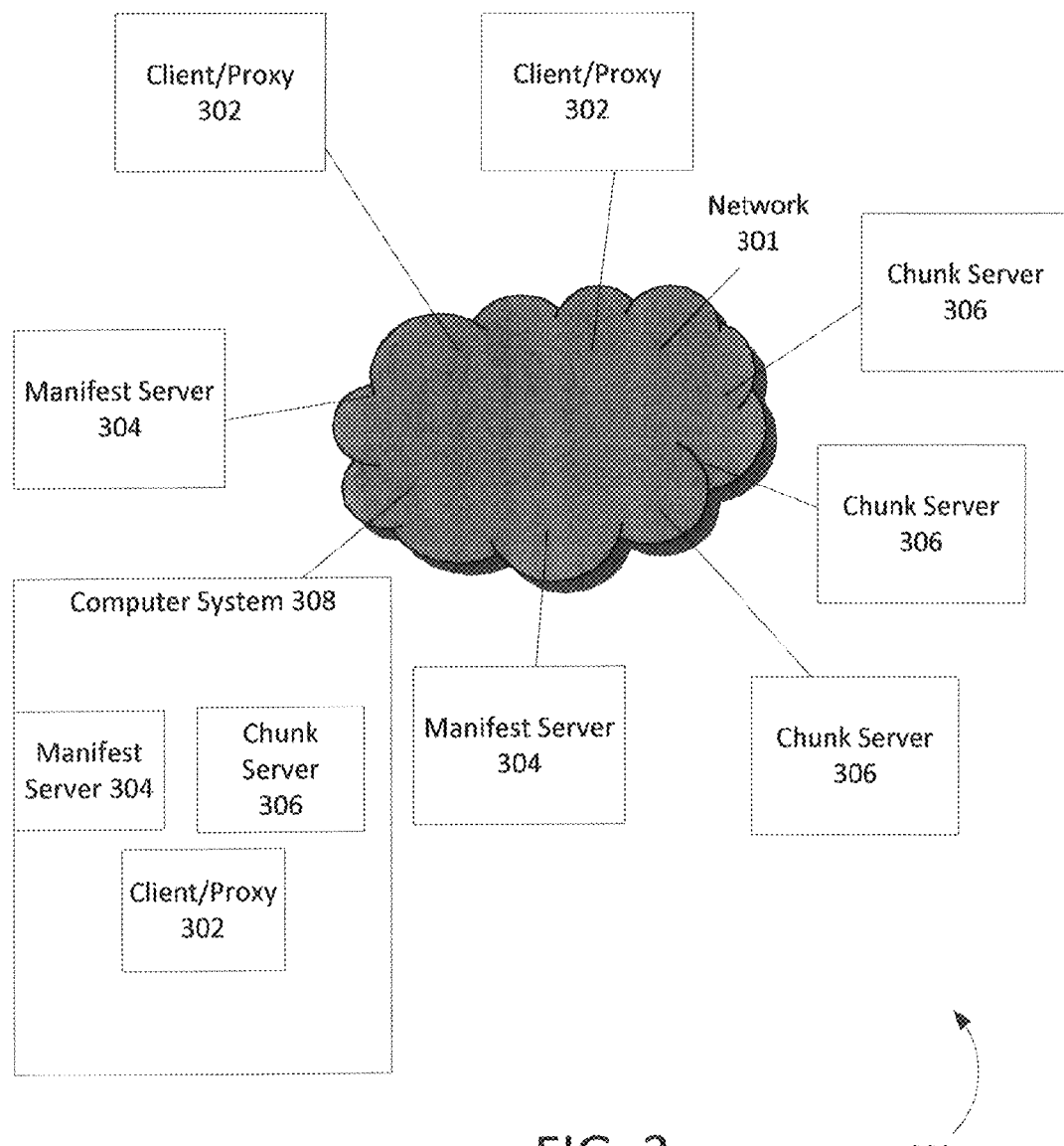
FIG. 3 is a high-level system diagram showing various components of a distributed deduplication system for storing object chunks in accordance with an embodiment of the invention.

FIG. 3 is a high-level system diagram showing various components of a distributed deduplication system 300 for storing object chunks in accordance with an embodiment of the invention. As shown, the system 300 may include multiple clients or proxies operating on behalf of clients (client/proxy) 302, multiple manifest servers 304 and multiple chunk servers 306. A network 301 may communicatively interconnect the other components of the system 300.

In one implementation of the system 300, a client/proxy 302 may initiate an object put transaction with a manifest server 304. Subsequently, the client/proxy 302 may perform zero or more chunk puts with chunk servers 306 before completing the transaction with the manifest server 304.

The manifest servers 304 collect information about objects as collections of chunks. The metadata stored about an object at a manifest server 304 may include an indication as to whether or not the chunks for the object are encrypted.

The chunk servers 306 store chunks and retrieve chunks. The chunk servers 306 may also validate the chunk identifiers ("fingerprints") of chunks put to them.

Note that each component of the storage system need not be on a separate computer system. For example, a manifest server 304 and a chunk server 306 may be implemented on a same computer system (i.e. the same machine) 308, and that computer system 308 may be connected to the network 301. In another implementation, a client/proxy 302 may also be on the same computer system 308.

Figure 4:
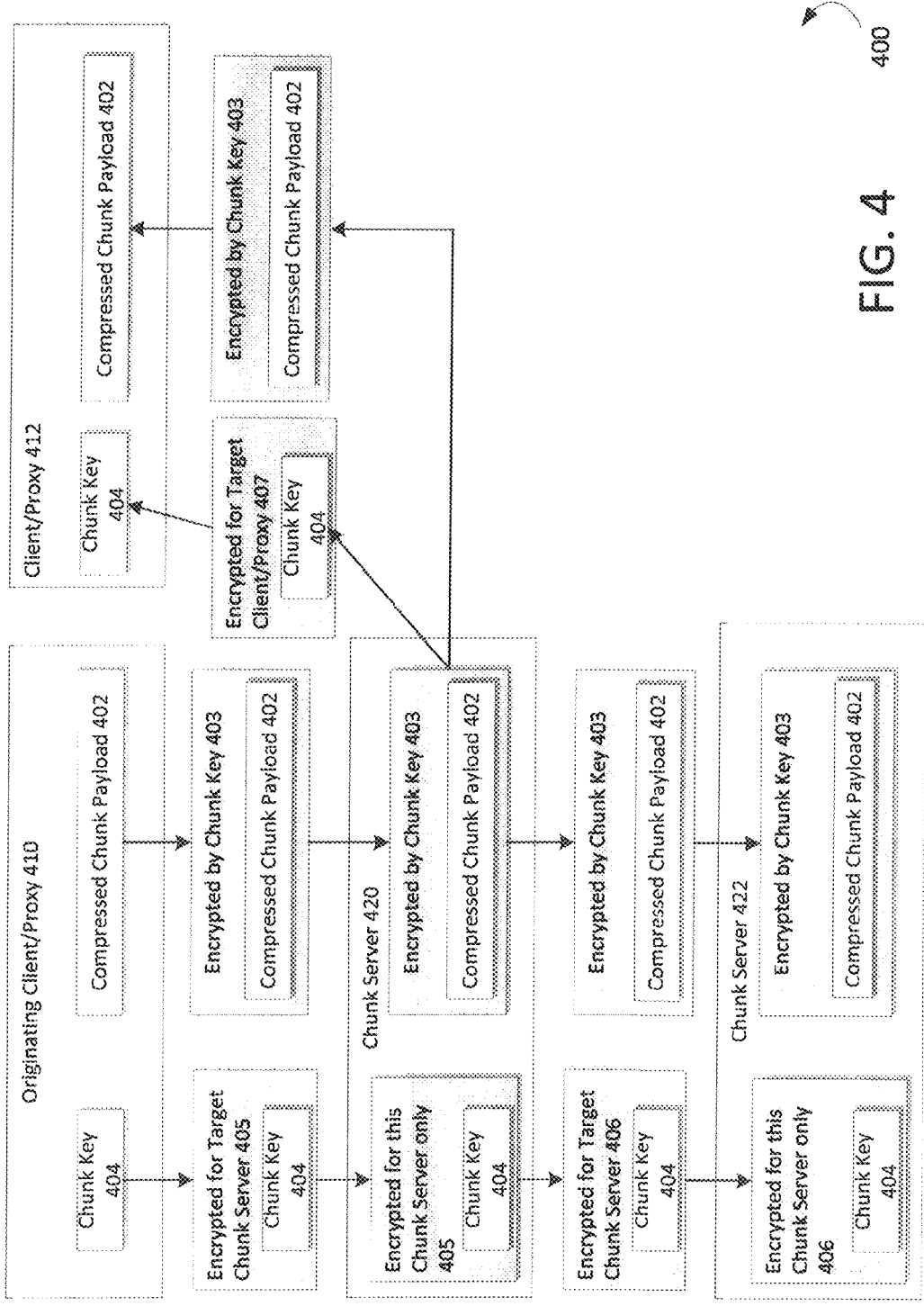
FIG. 4 is a high-level flow diagram depicting end-to-end chunk encryption for a distributed deduplication system in accordance with an embodiment of the invention.

FIG. 4 is a high-level flow diagram depicting end-to-end chunk encryption for a distributed deduplication system in accordance with an embodiment of the invention. In particular, the diagram depicts a chunk being sent from an originating client/proxy 410 for storage at a first chunk server 420. The diagram further depicts the chunk being replicated from the first chunk server 420 to a second chunk server 422. In addition, the diagram shows another client/proxy 412 retrieving the chunk from the first chunk server 420.

As shown, a compressed chunk payload 402 and a chunk key 404 to be put to the distributed deduplication system may be stored in plaintext (unencrypted) at the originating client/proxy 410. The chunk payload may be compressed by the originating client/proxy 410 so as to form the compressed chunk payload 402, and the chunk key 404 may be generated by the originating client/proxy 410 in an effectively random manner.

The originating client/proxy 410 may send the chunk for storage in the distributed deduplication system. Before the chunk is sent, an encrypted compressed chunk payload 403 is generated by the originating client/proxy 410. This may be accomplished by the originating client/proxy 410 encrypting the compressed chunk payload 402 using the chunk key 404. Also before the chunk is sent, an encrypted key 405 may be generated by the originating client/proxy 410 encrypting the chunk key 404 specifically for the first chunk server 420 to be able to decrypt it. The first chunk server 420 stores the encrypted compressed chunk payload 403 and the encrypted key 405 (as encrypted specifically for the first chunk server 420).

The first chunk server 420 may replicate the chunk for redundant storage at the second chunk server 422. Before the chunk is sent, the chunk key 404 is decrypted by the first chunk server 420 and then re-encrypted by the first chunk server 420 specifically for the second server 422 to be able to decrypt it. The encrypted compressed chunk payload 403 and the re-encrypted chunk key 406 are then sent from the first chunk server 420 to the second chunk server 422. Note that while the encryption of the payload 402 remains the same between the first and second chunk servers, the encryption of the chunk key 404 is changed before the first chunk server sends it to the second chunk server. The second chunk server 422 stores the encrypted compressed chunk payload 403 and the encrypted key 406 (as encrypted specifically for the second chunk server 422).

As further shown, the other client/proxy 412 may retrieve the chunk from the first chunk server 420. Before the chunk is retrieved, the chunk key 404 is decrypted by the first chunk server 420 and then re-encrypted by the first chunk server 420 specifically for the client/proxy 412 to be able to decrypt it. The encrypted compressed chunk payload 403 and the re-encrypted chunk key 407 are then sent from the first chunk server 420 to the client/proxy 412. The other client/proxy 412 stores the encrypted compressed chunk payload 403 and the encrypted key 407 (as encrypted specifically for the client/proxy 412).

Encrypted Chunk Put

Figure 5:
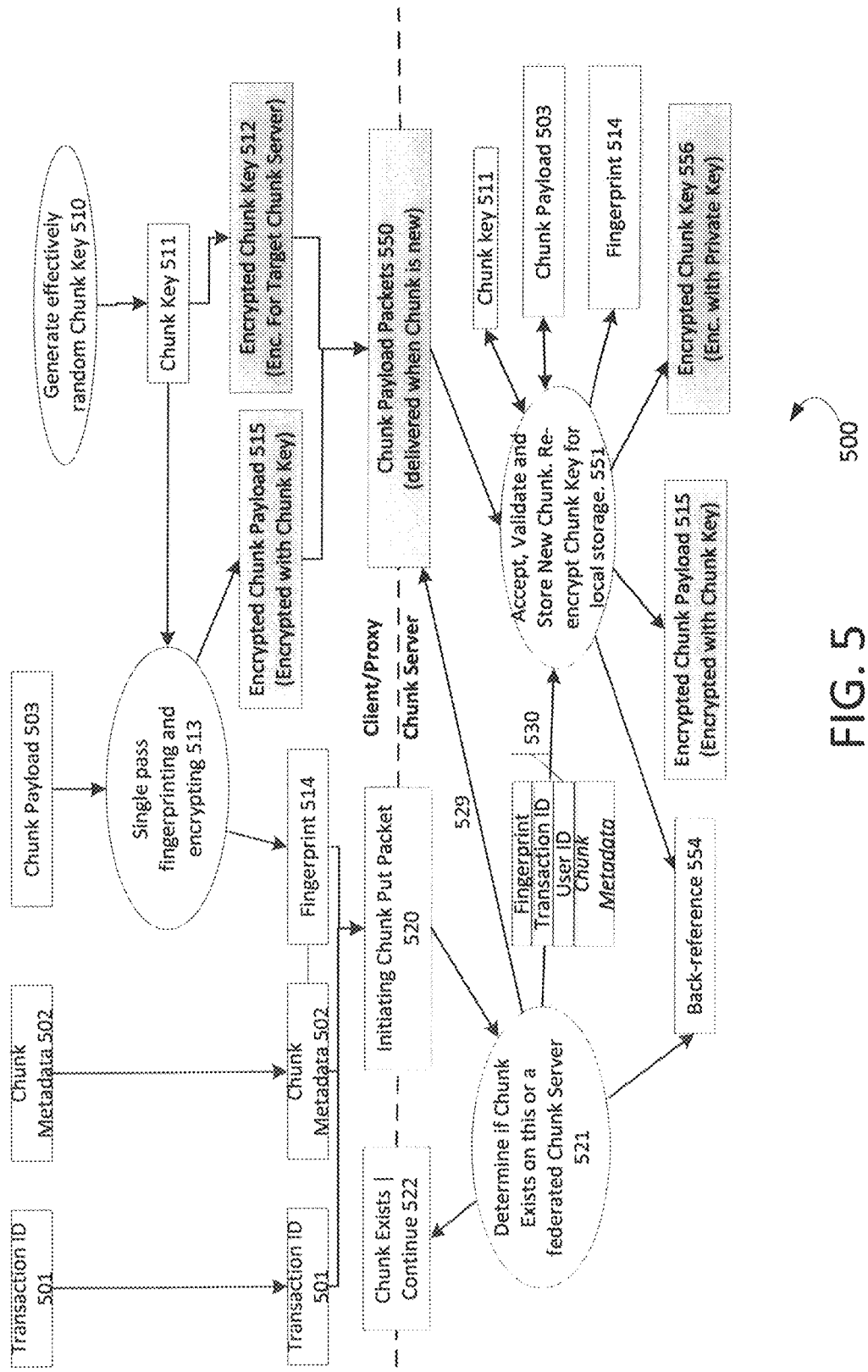
FIG. 5 is a detailed flow diagram depicting a method of putting an encrypted chunk to a distributed deduplication system in accordance with an embodiment of the invention.

FIG. 5 is a detailed flow diagram depicting a method 500 of putting of an encrypted chunk to a distributed deduplication system in accordance with an embodiment of the invention. The top part of the diagram depicts actions performed by, and items stored in, a Client/Proxy (i.e. a client or a proxy on behalf of the client). The bottom part of the diagram depicts actions performed by, and items stored in, a Chunk Server. Items on the border between the top and bottom parts are those that are communicated between the Client/Proxy and the Chunk Server.

As depicted in FIG. 5, the Client/Proxy has three inputs available when it begins to put a chunk: a transaction identifier (ID) 501; chunk metadata 102; and (optionally compressed) chunk payload 103.

The transaction ID 501 identifies the transaction that this chunk put is part of. The transaction ID 501 may encode the object being put or modified, the class of storage requested, an indicator that the chunks for this object should be encrypted, and a signature covering the entire transaction ID 501 validating that it was created by an authorized manifest server 304. The Transaction ID 501 may be obtained from the manifest server 304 in an initial manifest pre-put operation.

The chunk metadata 502 includes information about the chunk. In one implementation, the chunk metadata 502 may include the compression algorithm used (if any), the chunk logical length, and the compressed length of the chunk.

The chunk payload 503 may be optionally compressed. Note that the list of compression algorithms that may be applied should include "None" so as to allow already compressed content to be effectively stored.

The Client/Proxy may then perform steps 510 and 513 to prepare the content.

In step 510, an effectively random chunk key 511 may be generated. If a true random number generator is not available this key should be "salted" with as many sources as are available to the process. There are many well-known techniques for generating effectively random numbers in lieu of access to a truly random input stream.

In step 513, a single pass may be taken over the chunk payload 503 to produce both a fingerprint (chunk identifier) 514 and an encrypted chunk payload 515. The fingerprint 514 may be generated by applying a cryptographic hash (or other fingerprinting process) to the unencrypted (optionally compressed) chunk payload 503. The encrypted (optionally compressed) chunk payload 515 may be encrypted using the chunk key 511.

The Chunk Put operation may then be initiated with a packet 520 that is sent from the Client/Proxy to the Chunk Server. The initiating chunk put packet 520 may include the fingerprint 514 and also request modifier which include the transaction ID 501 and the chunk metadata 502. The fingerprint 514 identifies the chunk that is being put. In a preferred embodiment, the fingerprint 514 is the target specified in an HTTP/REST Manifest Put request.

The Chunk Server, upon receiving the initiating packet, determines in step 521 whether it (or any of its federated chunk servers) already has a chunk stored with the fingerprint 514.

If a chunk with that fingerprint 514 is already stored, then the Chunk Server will return an acknowledgement for the Chunk Put operation to the Client/Proxy. The acknowledgement packet 522 may indicate that the chunk already exists, and, therefore, the client need take no further action. The chunk server may then add a back-reference 554 for the fingerprint-identified chunk.

In a preferred embodiment, the back-reference 554 may be derived from the transaction ID 501. Note that the use of back-references is the method chosen in the preferred embodiment to track chunk usage and to prevent wasting storage on chunks that are no longer referenced in any manifest. There are other techniques that could be applied, such as a reference counter. The mechanism selected does not impact the encryption or decryption of chunks.

Note that, in such cases where it is determined that a chunk with that fingerprint 514 is already stored, the Client/Proxy may encrypt the chunk, but it does not have to upload it to the Chunk Server because it has been identified by the Chunk Server as a duplicate of an already stored chunk. In this way, the storage cluster generally only accepts one copy of a chunk, saving storage, processing, and bandwidth resources. The storage cluster may thus be referred to as a deduplication storage system.

On the other hand, if the chunk is not already stored on the Chunk Server (or a federated chunk server), then the Chunk Server may perform steps 529 and 530. In step 529, the Chunk Server returns a packet to the Client/Proxy which prompts the client/proxy to provide the encrypted chunk payload 515 and the encrypted chunk key 512. The encrypted chunk key 512 is encrypted specifically for the Chunk Server. In addition, in step 530, various data fields may be saved in association with the encrypted chunk payload once received by the chunk server. The various data fields may include the fingerprint 514, the transaction ID 501, the user ID, and the chunk metadata 502.

When the Client/Proxy provides the chunk payload packets 550 (which deliver the encrypted chunk payload 515), it will also include the encrypted chunk key 512. The encrypted chunk key 512 is encrypted by the Client/Proxy specifically for the target Chunk Server to decrypt.

The Chunk Server performs the following operations, per step 551, to accept, validate and store the new chunk and also re-encrypt the chunk key for local storage. The Chunk Server decrypts the encrypted chunk key 512 to obtain the unencrypted chunk key 511. The Chunk Server also decrypts the encrypted chunk payload 515 to obtain the unencrypted chunk payload 503, but it does not save the unencrypted chunk payload 503.

In addition, the Chunk Server may validate the fingerprint 514 by applying the cryptographic hash (or other fingerprinting) algorithm to the unencrypted chunk payload 503. If the Client/Proxy supplied fingerprint and the Chunk Server calculated fingerprint do not match, then an error response indicating a presumed transmission error may be generated and returned to the Client Proxy. An error response may also be sent to a system administrator, for example, the system administrator for a virtual local area network (VLAN) that accesses the Chunk Server. In the case where repeated error responses are received due to a Client/Proxy repeatedly supplying invalid fingerprints, the system administrator may determine that the Client/Proxy is a malfunctioning and/or malicious. In that case, the system administrator may block access to the system from the Client/Proxy. For example, the system administrator may exclude the IP address of the Client/Proxy from the VLAN.

Otherwise, if the supplied and calculated fingerprints do match, then the Chunk Server may proceed to (i) save the encrypted chunk payload 515 as received, (ii) save an encrypted chunk key 556 which is generated by re-encrypting the chunk key 511 with a private key known only to the Chunk Server, and (iii) save the transaction ID 501 as the back-reference 554 for the newly-stored chunk.

Non-Encrypted Chunk Put

In accordance with an embodiment of the invention, the Client/Proxy may also elect to put chunks that are not encrypted. To do so, the Client/Proxy may vary its steps as follows. The Client/Proxy does not request that the object be encrypted in the manifest pre-put operation. The Client/Proxy also does not generate a chunk key and does not generate the encrypted chunk payload. Finally, the Client/Proxy does not include the chunk key modifier in the Chunk Put operation.

If both encrypted and non-encrypted chunk puts are supported, then the chunk servers must maintain two sets of chunks: a first set including those chunks that were received with a chunk key; and a second set including those chunks that were received in plain text without a chunk key. The encrypted chunks may be stored in a manner that invokes data integrity protection from the local file system of the chunk servers. For example, a cryptographic hash from the set of SHA-2 cryptographic hashes may be used. The cryptographic hash may be preferably at least the equivalent of SHA-256 in terms of security. The non-encrypted chunks do not require the local file system to provide this protection because the Chunk Get operation may readily validate the unencrypted chunk payload against the fingerprint (chunk ID).

Encrypted Chunk Get

Figure 6A:
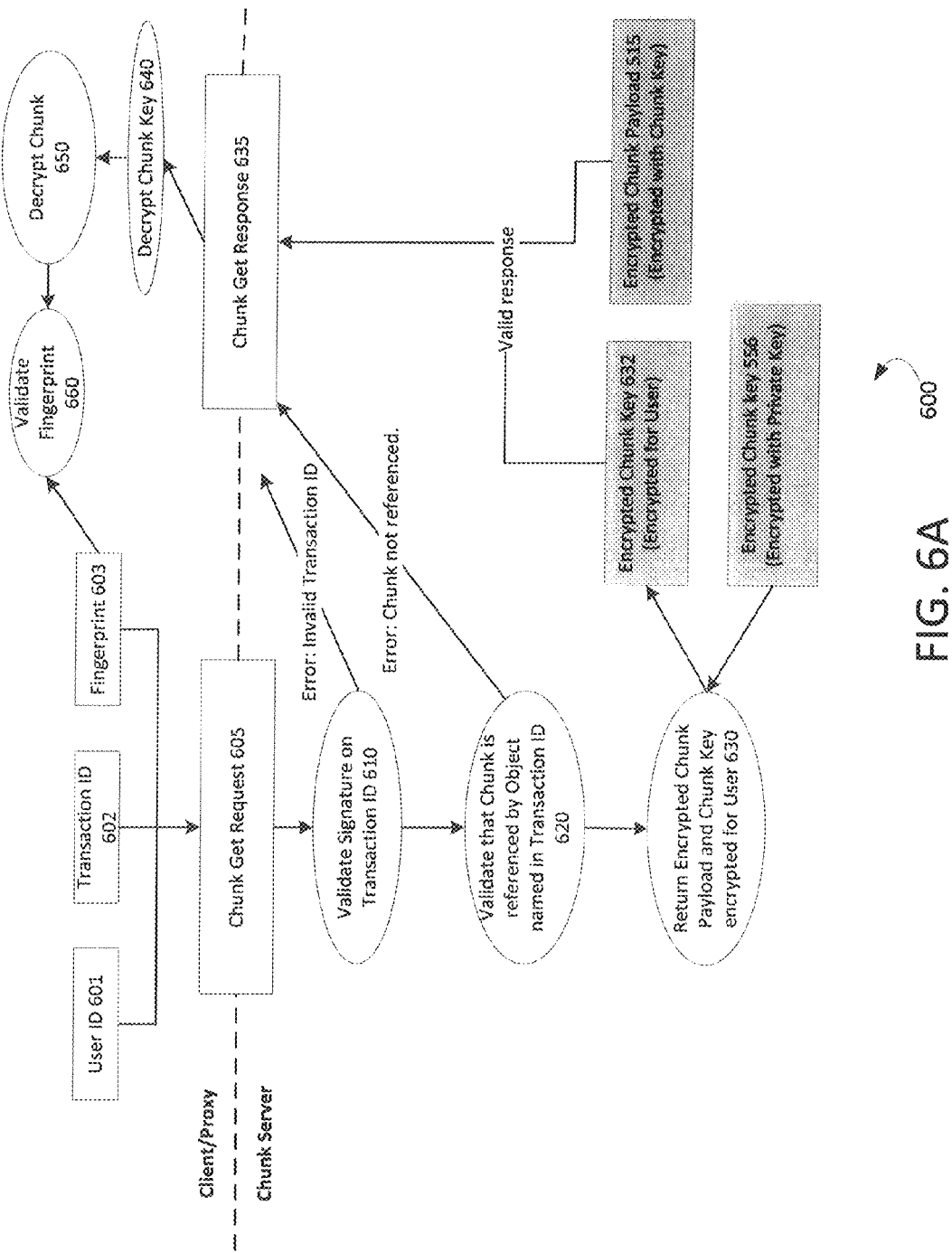
FIG. 6A is a detailed flow diagram depicting a method of getting an encrypted chunk from a distributed deduplication system in accordance with an embodiment of the invention.

FIG. 6A is a detailed flow diagram depicting a method 600 of getting a encrypted chunk from a distributed deduplication system in accordance with an embodiment of the invention. The top part of the diagram depicts actions performed by, and items stored in, a Client/Proxy (i.e. a client or a proxy on behalf of the client). The bottom part of the diagram depicts actions performed by, and items stored in, a Chunk Server. Items on the border between the top and bottom parts are those that are communicated between the Client/Proxy and the Chunk Server.

The Client/Proxy may generate a Chunk Get Request 605 and send it to the Chunk Server. As depicted, the Chunk Get Request 605 may include a user ID 601, a transaction ID 602, and the fingerprint 603 of the chunk being requested.

The Chunk Server may process the Chunk Get Request 605 by performing the following steps.

Per step 610, the Chunk Server may validate the transaction ID 602 by checking whether it includes an authenticating signature of an authorized manifest server 304. If the transaction ID 602 is determined to be not valid because it lakes the authenticating signature, then an error message indicating an invalid transaction ID may be returned via a Chunk Get Response 635.

Per step 620, the Chunk Server may validate the requested chunk by checking whether it has a back-reference to the object referenced within (named in) the transaction ID 602. If requested chunk is determined to be invalid because it lacks a back-reference to the object named in the transaction ID 602, then an error message indicating that the chunk is not referenced may be returned via a Chunk Get Response 635.

If both the transaction ID 602 and the requested chunk are validated, then, per step 630, the Chunk Server may return the encrypted chunk payload 515 and the encrypted chunk key 632 which is encrypted for the requesting user (as identified by the user ID). The encrypted chunk key 632 may be generated by decrypting the encrypted chunk key 556 using the private key of the Chunk Server and then re-encrypting the chunk key for the requesting user (such that the user will be able to decrypt it). A Chunk Get Response 635 which is a valid response and includes the encrypted chunk payload 515 and the encrypted chunk key 632 may then be sent to the Client/Proxy.

The Client/Proxy may receive the valid response. Assuming the chunk key modifier is present such that chunk encryption is indicated, the Client/Proxy may decrypt the chunk key per step 640. The chunk key may then be used to decrypt the chunk payload per step 650. Lastly, the decrypted chunk payload may be validated per step 660. The payload validation may be performed by generating a fingerprint from the decrypted payload and comparing the generated fingerprint with the fingerprint 603 that was sent in the Chunk Get Request 605.

In one embodiment, the system may include a process for client-triggered repair of a chunk. When the Chunk Server delivers the encrypted (optionally compressed) chunk payload to a Client/Proxy, the Chunk Server includes a metadata indicator that will allow it to identify which copy of the stored chunk it referenced to fulfill this chunk get request.

Should the Client/Proxy's validation of the decrypted optionally compressed chunk payload fail, the Client/Proxy will return a invalid-chunk-get notification to the chunk server identifying the chunk that failed the validation and including the metadata field indicating which copy of the chunk image had been read.

The Chunk Server will then determine whether the suspect image is in fact bad, and if it is, then the Chunk Server will repair or replace the bad replica using local or network copies and/or RAID error correction.

Figure 6B:
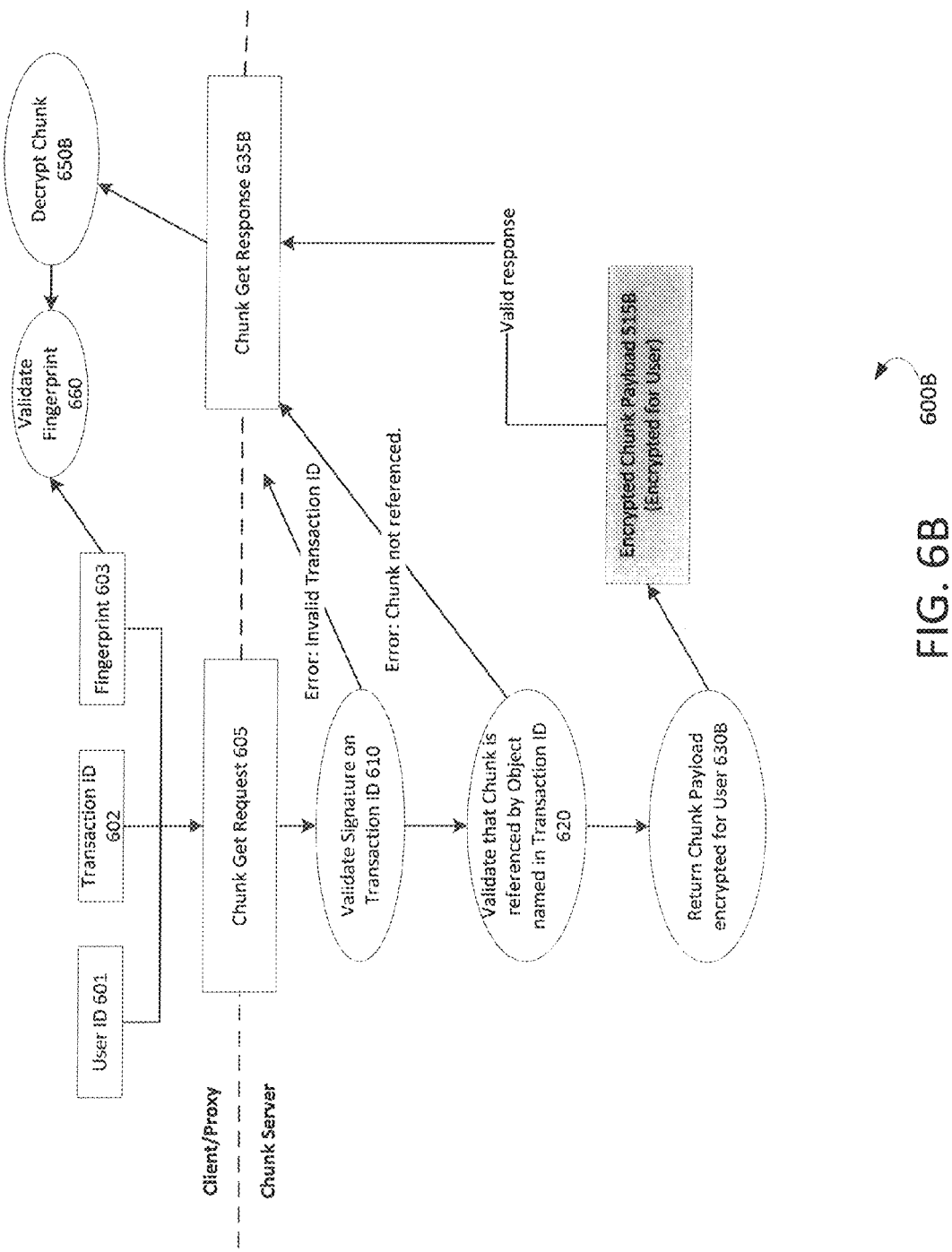
FIG. 6B is a detailed flow diagram depicting a method of getting an encrypted chunk from a distributed deduplication system in accordance with an alternate embodiment of the invention.

FIG. 6B is a detailed flow diagram depicting a method 600B of getting an encrypted chunk from a distributed deduplication system in accordance with an alternate embodiment of the invention. The method 600B of FIG. 6B is similar to the method 600 of FIG. 6A. Described below are the steps in the method 600B of FIG. 6B that differ from the steps in the method 600A of FIG. 6A.

If both the transaction ID 602 and the requested chunk are validated per steps 610 and 620, then, per step 630B, the Chunk Server may return the encrypted chunk payload 515B which is encrypted for the requesting user (as identified by the user ID). A Chunk Get Response 635B which is a valid response and includes the encrypted chunk payload 515B may then be sent to the Client/Proxy.

The Client/Proxy may receive the valid response. The Client/Proxy may then decrypt the chunk payload per step 650B. Thereafter, the decrypted chunk payload may be validated per step 660.

Non-Encrypted Chunk Get

In one embodiment, the transaction ID 602 obtained from the manifest server 304 encodes whether or not the chunk for a requested object are encrypted. The transaction ID 602 is passed with the Chunk Get Request 605 from the Client/Proxy to the Chunk Server. In one implementation, the Chunk Server may determine from the transaction ID 602 whether an encrypted chunk directory or a non-encrypted chunk direction is to be used to get the chunk.

Chunk Replication

Figure 7:
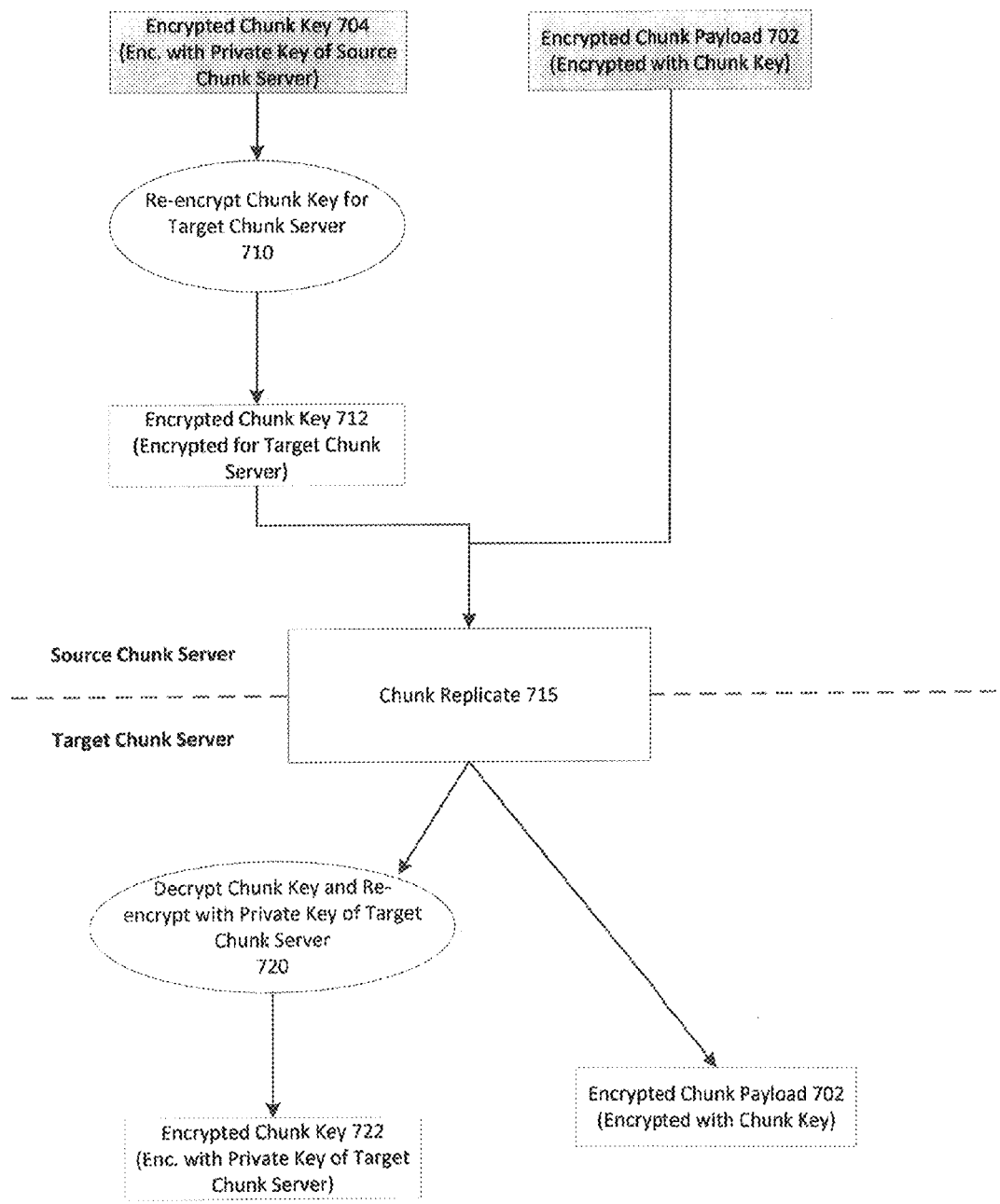
FIG. 7 is a detailed flow diagram showing the replication of an encrypted chunk in a distributed deduplication system in accordance with an embodiment of the invention.

FIG. 7 is a detailed flow diagram showing a method 700 of replicating an encrypted chunk in a distributed deduplication system in accordance with an embodiment of the invention. The top part of the diagram depicts actions performed by, and items stored in, the Source Chunk Server. The bottom part of the diagram depicts actions performed by, and items stored in, the Target Chunk Server. Items on the border between the top and bottom parts are those that are communicated between the Source Chunk Server and the Target Chunk Server.

Consider the case where the Source Chunk Server is replicating an encrypted chunk to the Target Chunk Server. Both the Source Chunk Server and the Target Chunk Server are members of a group of federated chunk servers. The Source Chunk Server obtains the encrypted chunk payload 702 and the encrypted chunk key 704 for the chunk to be replicated. As described above, the encrypted chunk payload 702 is encrypted with the chunk key, and the encrypted chunk key 704 is encrypted with a private key of the Source Chunk Server.

In step 710, the Source Chunk Server obtains the encrypted chunk key 704, decrypts it, and then re-encrypts it for the Target Chunk Server. The result is the encrypted chunk key 712 that is encrypted such that it may be decrypted by the Target Chunk Server.

The Source Chunk Server then sends a Chunk Replicate Request 715 to the Target Chunk Server. The Chunk Replicate Request 715 includes both the encrypted chunk payload 702 and the encrypted chunk key 712.

Target Chunk Server receives the Chunk Replicate Request 715. In step 720, the encrypted chunk key 712 is decrypted and then re-encrypted with a private key of the Target Chunk Server. The resultant encrypted chunk key 722 (encrypted with the private key of the Target Chunk Server) is stored along with the encrypted chunk payload 702 in local storage at the Target Chunk Server.

Replication of non-encrypted chunks is straightforward. To replicate an unencrypted chunk merely requires performing a chunk replicate of the unencrypted chunk payload without a chunk key modifier (such that there is no need to decrypt and re-encrypt a chunk key).

Scrubbing Data

Scrubbing of stored data requires a Chunk Server to: (i) obtain the chunk key and decrypt it; (ii) read the encrypted compressed chunk payload; (iii) calculate the cryptographic hash (or other) fingerprint of the payload data; (iv) validate the calculated fingerprint by matching it against the chunk identifier; and (v) if they do not match, then the chunk is invalid and may be, for example, quarantined so that the chunk will no longer be retrievable.

Example Computer Apparatus

Figure 8:
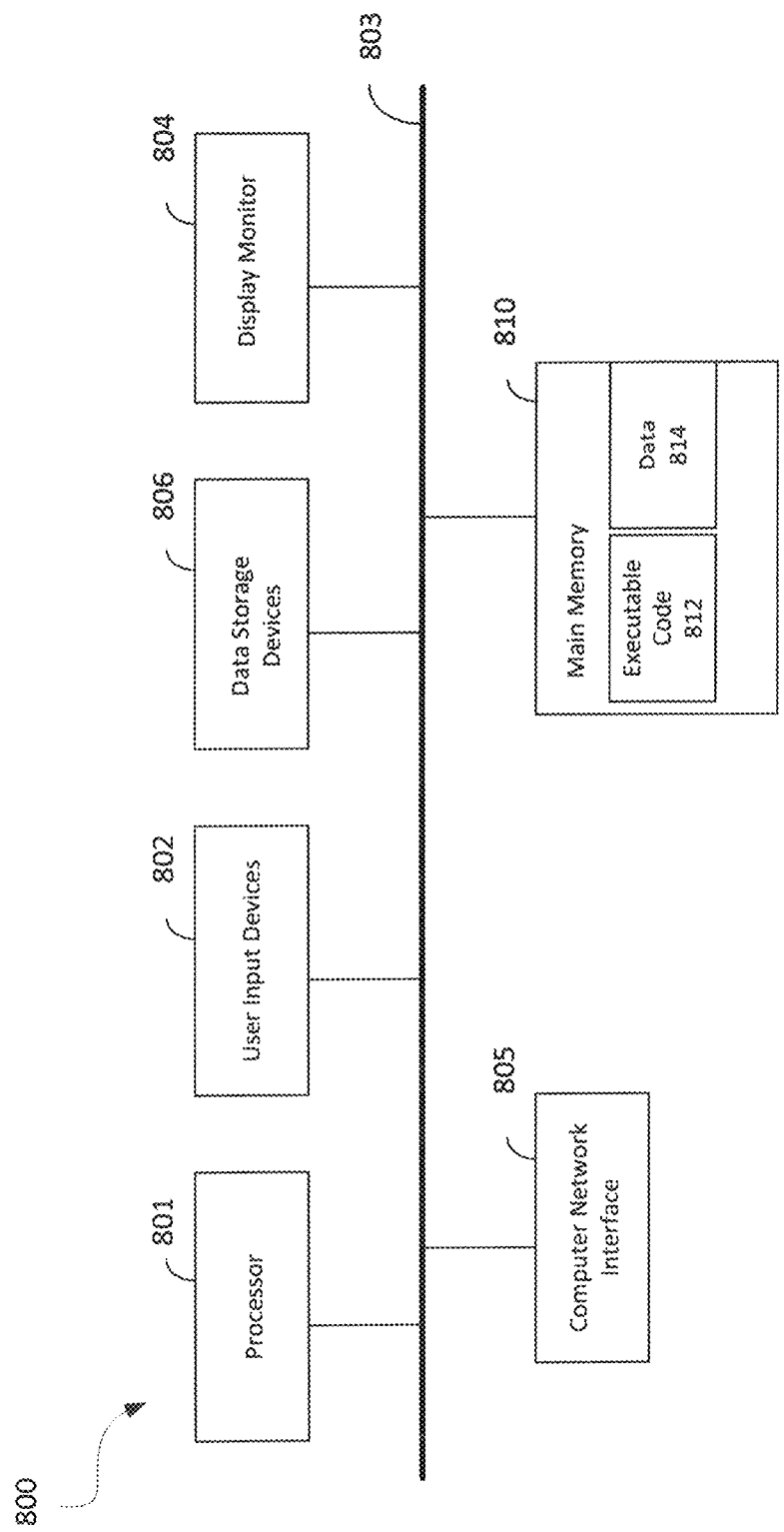
FIG. 8 depicts a simplified example of a computer apparatus which may be configured as a client or a server in the system in accordance with an embodiment of the invention.

FIG. 8 depicts a simplified example of a computer apparatus 800 which may be configured as a client or a server in the system in accordance with an embodiment of the invention. This figure shows just one simplified example of such a computer. Many other types of computers may also be employed, such as multi-processor computers.

As shown, the computer apparatus 800 may include a processor 801, such as those from the Intel Corporation of Santa Clara, Calif., for example. The computer apparatus 800 may have one or more buses 803 communicatively interconnecting its various components. The computer apparatus 800 may include one or more user input devices 802 (e.g., keyboard, mouse, etc.), a display monitor 804 (e.g., liquid crystal display, flat panel monitor, etc.), a computer network interface 805 (e.g., network adapter, modem), and a data storage system that may include one or more data storage devices 806 which may store data on a hard drive, semiconductor-based memory, optical disk, or other tangible non-transitory computer-readable storage media 807, and a main memory 810 which may be implemented using random access memory, for example.

In the example shown in this figure, the main memory 810 includes instruction code 812 and data 814. The instruction code 812 may comprise computer-readable program code (i.e., software) components which may be loaded from the tangible non-transitory computer-readable medium 807 of the data storage device 806 to the main memory 810 for execution by the processor 801. In particular, the instruction code 812 may be programmed to cause the computer apparatus 800 to perform the methods described herein.

ADDITIONAL EMBODIMENTS

The following are additional embodiments of the invention disclosed herein.

Additional Embodiment 1

A method of putting an encrypted chunk to an object storage system supporting distributed deduplication, the method comprising:

calculating a cryptographic hash to fingerprint an unencrypted payload by a client/proxy (a client, or proxy acting on behalf of the client), after optional compression has been applied at the client/proxy;

sending a chunk put request to a chunk server that identifies the chunk to be put by a fingerprint, wherein the chunk server was selected either because it is co-located with the client/proxy or by a consistent hashing algorithm.

Additional Embodiment 2

The method of additional embodiment 1 further comprising:

determining by the chunk server whether a specified chunk identifier is already stored within a federated set of chunk servers by checking local storage of the chunk server and at least one of the chunk servers designated to store the specified chunk identifier by the consistent hashing algorithm.

Additional Embodiment 3

The method of additional embodiment 2 further comprising:

indicating by the chunk server to the client/proxy whether the chunk was already stored, or whether a chunk payload is to be provided.

Additional Embodiment 4

The method of additional embodiment 3 further comprising:

when the chunk payload is to be provided, the client/proxy performs steps including generating an effectively random chunk key that is not correlated with the chunk payload, encrypting the chunk payload with the generated chunk key, sending the encrypted chunk payload to the chunk server, encrypting the chunk key for the chunk server, and sending encrypted chunk key to the chunk server.

Additional Embodiment 5

The method of additional embodiment 4 further comprising:

receiving the encrypted chunk payload and the encrypted chunk key by the chunk server; and validating the encrypted chunk payload by the chunk server, wherein the validating is performed by decrypting the encrypted chunk key, decrypting the received payload with the decrypted chunk key, calculating the cryptographic hash fingerprint of the decrypted chunk payload, comparing the calculated fingerprint with the fingerprint identifying the chunk, and declaring the chunk to be invalid if said fingerprints do not match.

Additional Embodiment 6

The method of additional embodiment 5, wherein if said fingerprints do match, then storing the encrypted chunk payload as a chunk image at the chunk server, encrypting the chunk key with a private key shared with no other server, including the encrypted chunk key in chunk metadata for the chunk image, and writing the chunk metadata at the chunk server.

Additional Embodiment 7

A method of retrieving a chunk, the method comprising:

receiving a chunk get request from a client/proxy to get a chunk from a chunk server of a chunk storage system;

using a chunk identifier to determine if the chunk is already stored locally as a local chunk image at the chunk server;

if the chunk is already stored locally at the chunk server, then performing a first procedure to use the local chunk image;

if the chunk is not already stored locally at the chunk server, and the chunk server is not designated to store the chunk identifier by a consistent hashing algorithm, then performing a second procedure to obtain a copy of a chunk image from a designated chunk server of the chunk storage system; and if the chunk is not stored in the chunk storage system, then returning an error message from the chunk server to the client/proxy.

Additional Embodiment 8

The method of additional embodiment 7, wherein the first procedure comprises:

reading the encrypted chunk payload;

forwarding the encrypted chunk payload as a payload in response to the chunk get request;

reading chunk metadata to obtain the encrypted chunk key;

decrypting the encrypted chunk key to obtain an unencrypted chunk key;

re-encrypting the unencrypted chunk key for the requesting client/proxy or user to obtain a re-encrypted chunk key;

appending a metadata field to the chunk metadata, the metadata field identifying the local chunk image; and sending the re-encrypted chunk key in the chunk metadata in further response to the chunk get request.

Additional Embodiment 9

The method of additional embodiment 8, wherein the second procedure comprises:

sending a chunk get request to a designated chunk server;

receiving the copy of the chunk image from the designated chunk server;

saving the copy of the chunk image locally;

forwarding a chunk payload of the chunk image to the client/proxy in response to the chunk get request;

decrypting a chunk key of the chunk image;

re-encrypting the chunk key for the client/proxy or user;

appending a metadata field to the chunk image, wherein the metadata field identifies the chunk image as being a copy of the chunk image at the designated chunk server; and sending the re-encrypted chunk key to the client/proxy as metadata in further response to the chunk get request.

Additional Embodiment 10

The method of additional embodiment 9 further comprising:

receiving the re-encrypted chunk key at the client/proxy;

decrypting the re-encrypted chunk key by the client/proxy to obtain the chunk key;

receiving the encrypted chunk payload at the client/proxy; and decrypting the encrypted chunk payload at the client/proxy using the chunk key to obtain a chunk payload.

Additional Embodiment 11

The method of additional embodiment 10 further comprising:

validating the chunk payload at the client/proxy by generating a fingerprint of the chunk payload and comparing the fingerprint against the chunk identifier;

if validation fails because the fingerprint does not match the chunk identifier, then sending an invalid payload notification to the chunk server, and re-sending the chunk get request to the chunk server.

Additional Embodiment 12

The method of additional embodiment 11, wherein if the invalid payload notification is received by the chunk server, the chunk server responds by if the chunk payload was obtained from the designated chunk server, then relaying the invalid payload notification to the designated chunk server and erasing all local copies of the chunk; and if the chunk payload is from a local chunk image, then validating the local chunk image, and if the local chunk image is invalid, then repairing or replacing the local chunk image using other local and/or network replicas of the chunk.

CONCLUSION

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. A method of putting an encrypted chunk to an object storage system supporting distributed deduplication, the method comprising:

calculating a cryptographic hash to fingerprint an unencrypted payload by a client/proxy (a client, or proxy acting on behalf of the client), after optional compression has been applied at the client/proxy;

sending a chunk put request to a chunk server that identifies the chunk to be put by a fingerprint, wherein the chunk server was selected either because it is co-located with the client/proxy or by a consistent hashing algorithm.

2. The method of claim 1 further comprising:

determining by the chunk server whether a specified chunk identifier is already stored within a federated set of chunk servers by checking local storage of the chunk server and at least one of the chunk servers designated to store the specified chunk identifier by the consistent hashing algorithm.

3. The method of claim 2 further comprising:

indicating by the chunk server to the client/proxy whether the chunk was already stored, or whether a chunk payload is to be provided.

4. The method of claim 3 further comprising:

when the chunk payload is to be provided, the client/proxy performs steps including generating an effectively random chunk key that is not correlated with the chunk payload, encrypting the chunk payload with the generated chunk key, sending the encrypted chunk payload to the chunk server, encrypting the chunk key for the chunk server, and sending encrypted chunk key to the chunk server.

5. The method of claim 4 further comprising:

receiving the encrypted chunk payload and the encrypted chunk key by the chunk server; and validating the encrypted chunk payload by the chunk server, wherein the validating is performed by decrypting the encrypted chunk key, decrypting the received payload with the decrypted chunk key, calculating the cryptographic hash fingerprint of the decrypted chunk payload, comparing the calculated fingerprint with the fingerprint identifying the chunk, and declaring the chunk to be invalid if said fingerprints do not match.

6. The method of claim 5, wherein if said fingerprints do match, then storing the encrypted chunk payload as a chunk image at the chunk server, encrypting the chunk key with a private key shared with no other server, including the encrypted chunk key in chunk metadata for the chunk image, and writing the chunk metadata at the chunk server.

* * * * *